US006909905B2

(12) United States Patent
Umeda et al.

(10) Patent No.: US 6,909,905 B2
(45) Date of Patent: Jun. 21, 2005

(54) MOBILE COMMUNICATIONS CONTROL INCLUDING CHANGE OF BIT RATE BASED ON TRAFFIC AND TRANSMIT POWER

(75) Inventors: Narumi Umeda, Yokohama (JP); Yasushi Yamao, Yokosuka (JP); Lan Chen, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 678 days.

(21) Appl. No.: 09/747,962

(22) Filed: Dec. 27, 2000

(65) Prior Publication Data

US 2001/0017882 A1 Aug. 30, 2001

(30) Foreign Application Priority Data

Dec. 28, 1999 (JP) ............................................ 11-375793

(51) Int. Cl.[7] .............................. H04B 7/00; H04Q 7/20
(52) U.S. Cl. .......................... 455/522; 455/453; 455/69; 455/67.13
(58) Field of Search ........................... 455/522, 69, 88, 455/134, 423, 453, 70, 135, 67.13, 115.3, 127.1, 67.16; 370/320, 335

(56) References Cited

U.S. PATENT DOCUMENTS

| | | | |
|---|---|---|---|
| 5,822,318 A | | 10/1998 | Tiedemann, Jr. et al. |
| 5,839,056 A | * | 11/1998 | Hakkinen .................... 455/69 |
| 6,069,883 A | * | 5/2000 | Ejzak et al. ................. 370/335 |
| 6,173,187 B1 | * | 1/2001 | Salonaho et al. ........... 455/453 |
| 6,400,929 B1 | | 6/2002 | Ue et al. |
| 6,421,370 B1 | * | 7/2002 | Yasaki ........................ 455/134 |
| 6,542,488 B2 | * | 4/2003 | Walton et al. ............... 455/522 |
| 6,668,159 B1 | * | 12/2003 | Olofsson et al. .......... 455/226.1 |
| 6,687,510 B2 | * | 2/2004 | Esteves et al. .............. 455/522 |

FOREIGN PATENT DOCUMENTS

| | | |
|---|---|---|
| CN | 1130963 A | 9/1996 |
| CN | 1233924 A | 11/1999 |
| EP | 0 709 973 | 5/1996 |
| EP | 0 886 389 | 12/1998 |
| JP | 8-70273 | 3/1996 |
| JP | 8-289367 | 11/1996 |
| JP | 9-504914 | 5/1997 |
| JP | 9-506231 | 6/1997 |
| JP | 11-266168 | 9/1999 |
| WO | WO 95/07578 | 3/1995 |
| WO | WO 96/04718 | 2/1996 |
| WO | WO 97/24820 | 7/1997 |
| WO | WO 98/30057 | 7/1998 |
| WO | WO 99/55112 | 10/1999 |
| WO | WO 99/60796 | 11/1999 |

OTHER PUBLICATIONS

S.– J. Oh, et al., WCNC 1999 IEEE Wireless Communications and Networking Conference, Conference Record, pp. 510–514, "Adaptive Resource Allocation in Power Constrained CDMA Mobile Networks", Sep. 21–24, 1999.

M. Wang, et al., International Zurich Seminar on Broadband Communication, pp. 45–50, XP–002930743, "A Wireless Multimedia DS–CDMA Network Based on Adaptive Transmission Rate/Power Control", Feb. 17, 1998.

\* cited by examiner

*Primary Examiner*—Nay Maung
*Assistant Examiner*—John J. Lee
(74) *Attorney, Agent, or Firm*—Oblon, Spivak, McClelland, Maier & Neustadt, P.C.

(57) ABSTRACT

A mobile communication control system, which includes at least one mobile station and at least one base station, includes first through third parts. The first part measures traffic of radio channels in one or both of the above-mentioned at least one mobile station and the above-mentioned at least one base station. The second part measures a communications quality of radio channels in use. The third part determines a transmit power on a transmitting side and an information transmission bit rate on the basis of the traffic of the radio channels in use and information as to whether the transmit power on the transmitting side has reached a maximum transmit power.

10 Claims, 6 Drawing Sheets

MOBILE COMMUNICATIONS CONTROL INCLUDING CHANGE OF BIT RATE BASED ON TRAFFIC AND TRANSMIT POWER

BACKGROUND OF THE INVENTION

1. Field of the Invention

The present invention relates to a mobile communications control method and system, and more particularly to a mobile communications control including a transmit power control and information transmission bit rate control on a radio communications channel formed among at least one a base station and at least one mobile station in mobile communications that are typically portable telephones.

2. Description of the Related Art

Mobile communications employ a transmit power control to reduce the transmit power to the minimum level at which a given communication quality can be satisfied. The transmit power control makes it possible to reduce interference with a communication involved in another mobile station and thus improve the communications quality and to increase the capacity of the entire system. It is also possible to reduce consumption power and save the battery installed in the mobile station.

Particularly, in a radio access system of CDMA (Code Division Multiple Access), the transmit power control is essential to decrease interference as low as possible because an increase in the subscriber capacity directly depends on the decrease of interference. In CDMA, there is a proposal in which the transmit power of the mobile station is controlled so that the received CIR (Carrier Interference Ratio) in the base station becomes equal to a given target CIR, while the transmit power of the base station is controlled so that the received CIR in the mobile station becomes equal to a given target CIR. Here, the CIR is a ratio between a desired signal and an interfering signal and is computed by dividing a desired-signal power obtained by despreading, using a spreading code, of a received signal including a signal spread by the above spreading code on a transmitting side by an interfering-signal power.

Figure 1:
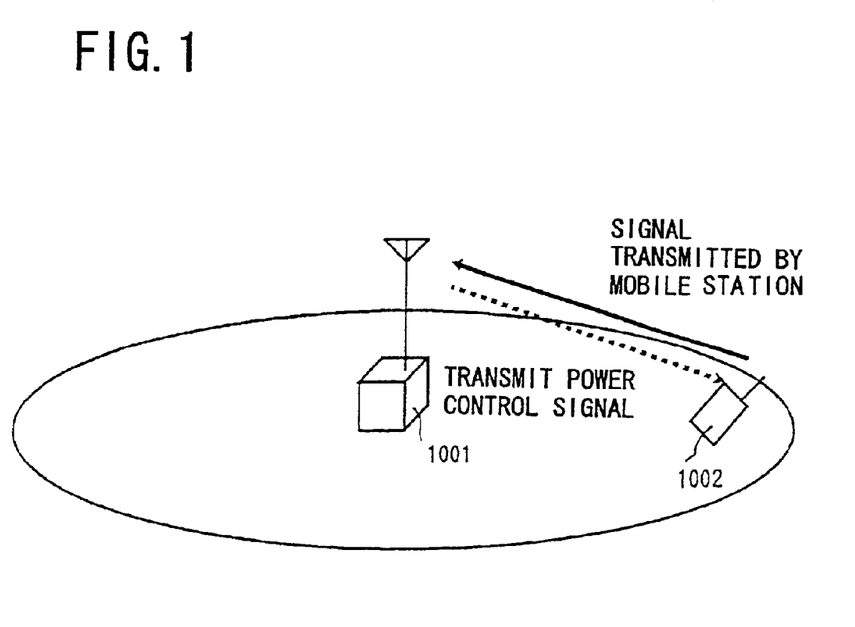
FIG. 1 is a diagram of a conventional method of controlling the transmit power of a mobile station.

FIG. 1 shows an example of a method of controlling the transmit power of the mobile station. Referring to FIG. 1, when the received CIR in a base station 1001 is lower than the target CIR, the base station 1001 transmits a transmit power control signal "1" in order to increase the transmit power of a mobile station. A mobile station 1002 receives the transmit power control signal "1", and increases the transmit power by, for example, 1 dB. In contrast, when the received CIR in the base station 1001 is higher than the target CIR, the base station 1001 transmits a transmit power control signal "0" in order to decrease the transmit power of the mobile station. The mobile station 1002 receives the transmit power control signal "0", and decreases the transmit power by, for example, 1 dB.

In CDMA, when an increased number of mobile stations simultaneously communicates within an identical cell, interference increases and an increased transmit power is needed to satisfy the target CIR. A limited transmit power is available due to the characteristics of a transmission amplifier. Thus, if the number of mobile stations that simultaneously communicate exceeds a certain number, a mobile station will not be able to increase the transmit power to the target CIR.

Conventionally, a call admission control is carried out so that the number of mobile stations that are allowed to simultaneously communicate falls within a limit placed upon capacity. Thus, the average number of mobile stations that are in communications falls within the capacity limit. Therefore, it is possible, in circuit switched communications, to decrease the frequency of occurrence of a situation in which a call in communications is disconnected within a predetermined threshold and, in packet communications, to prevent occurrence of a situation in which packets are not transmitted so that the throughput greatly decreases and sometimes information cannot be transmitted at all.

However, in the mobile communications, the power of interference with a particular mobile station and the magnitude of the desired signal power change momentarily due to movement of the mobile station and a fluctuation of the received signal level, namely, fading. Even if all mobile stations satisfy the given quality at the time of call admission and channel assignment in handover, the given CIR and given communication quality may not be obtained due to an increase in interference and reduction in receiving desired power resulting from movement of mobile stations.

As described before, there is a limit on the transmit power. A mobile station that is located close to the base station may control the transmit power within the limit thereon. However, a mobile station that is located away from the base station may not anytime satisfy the given communications quality even at the maximum transmit power. In such a case, a call which utilizes a radio channel that does not satisfy the given communication quality is forced to be disconnected. The case mentioned above will frequency occur in a situation in which a sufficient transmit power is not available and the traffic increases.

Even when the traffic is not high as compared to the system capacity, the given communications quality may not be available at the maximum transmit power in a case where the mobile station is located away from the base station, in a cell periphery or in another case where the mobile station is located in the interior of a building and the received level is not high. In such cases, the call using the radio channel that cannot satisfy the given communications quality is forced to be disconnected. In packet communications, the target CIR may not be obtained and the packet loss rate may increase, so that the throughput may greatly be reduced.

As described above, the call which does not satisfy the given communications quality is disconnected. Thus, the conventional technique has a high ratio of call disconnect during communications and a low grade of service. If the number of simultaneous communications channels is reduced in order to increase the rate of call disconnect during communications, the system capacity will reduce. In packet communications, the throughput is reduced and the delay increases.

SUMMARY OF THE INVENTION

It is a general object of the present invention to overcome the above-mentioned disadvantages of the conventional art.

A more specific object of the present invention is to provide a mobile communication control capable of ensuring a given communications quality by reducing the information transmission bit rate if the given communications quality cannot be satisfied, so that communications can continue and the grade of service can be improved.

The above objects of the present invention are achieved by a mobile communication control system including at least one mobile station and at least one base station, the mobile communication control system including: a first part measuring traffic of radio channels in one or both of the above at least one mobile station and the above at least one base station; a second part measuring a communications quality of radio channels in use; and a third part determining a transmit power on a transmitting side and an information transmission bit rate on the basis of the traffic of the radio channels in use and information as to whether the transmit power on the transmitting side has reached a maximum transmit power.

The above objects of the present invention are also achieved by a base station in a mobile communications system, comprising: a received level measuring circuit measuring a received level of radio channels in use in order to recognize a traffic of the radio channels; a received CIR (Carrier Interference Ratio) measuring circuit measuring a received CIR of an associated one of the radio channels in order to measure a communications quality of each of the radio channels; and a base station control unit determining a transmit power of a mobile station and an information transmission bit rate on the basis of the traffic of the radio channels in use and information as to whether the transmit power of the mobile station has reached a maximum transmit power.

The above objects of the present invention are also achieved by a mobile station in a mobile communications system, comprising: a received CIR (Carrier Interference Ratio) of a-radio channel in use in order to measure a communications quality of the radio channel; and a control unit which controls a transmit power and an information transmission bit rate of the mobile station in accordance with a control signal regarding the transmit power and the information transmission bit rate sent by a base station and which proposes to the base station that the information transmission bit rate is reduced on the basis of a traffic of radio channels in use and information as to whether the transmit power of the mobile station has reached to a maximum transmit power.

The above objects of the present invention are also achieved by a mobile communications control method comprising the steps of: measuring a received level of radio channels in use in order to recognize a traffic thereof; measuring a received CIR (Carrier Interference Ratio) of a radio channel in order to measure a communications quality of the radio channel; and determining a transmit power of a mobile station and an information transmission bit rate on the basis of the traffic of the radio channels and information as to whether the transmit power of the mobile station has reached a maximum transmit power.

The above objects of the present invention are also achieved by a mobile communications control method comprising the steps of: measuring a received CIR (Carrier Interference Ratio) of a radio channel in use in order to measure a communications quality of the radio channel; and controlling a transmit power of the mobile station and an information transmission bit rate in accordance with a control signal regarding the transmit power and the information transmission bit rate sent by a base station; and proposing to the base station that the information transmission bit rate is changed on the basis of a traffic of radio channels in use and information as to whether the transmit power of the mobile station has reached to a maximum transmit power.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Figure 2:
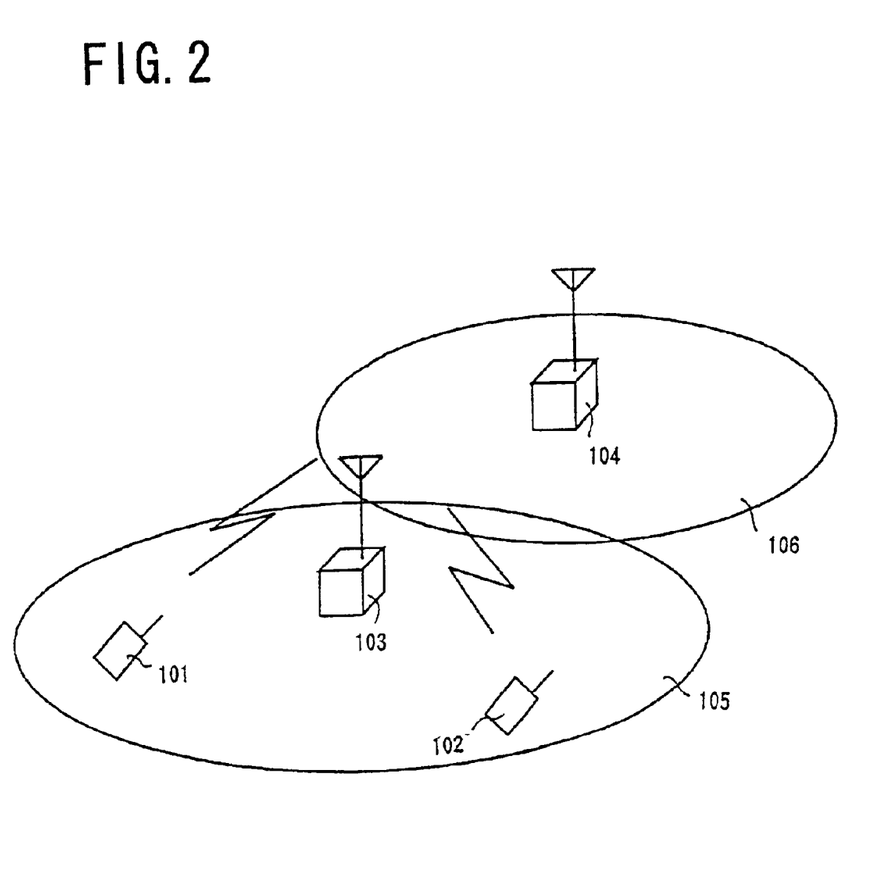
FIG. 2 is a diagram of a mobile communications control system according to an embodiment of the present invention.

FIG. 2 is a diagram of a mobile communications control system according to an embodiment of the present invention. Referring to FIG. 2, a first base station 103 forms a first cell 105, and a second base station 104 forms a second cell 106. A first mobile station 101 and a second mobile station 102 are connected to the first base station 103 by respective radio channels. The transmit power of the first mobile station 101 is controlled so that the received CIR of the first mobile station 101 in the first base station 103 becomes equal to the target CIR. The transmit power of the second mobile station 102 is controlled so that the received CIR of the second mobile station 102 in the first base station 103 becomes equal to the target CIR.

The transmit power of the first base station 103 is controlled so that the received CIR of the first base station 103 in the first and second mobile stations 101 and 102 becomes equal to the target CIR, respectively. Although not illustrated in FIG. 2, the second base station 104 performs the transmit power control when a mobile station is located in the second cell 106, and such a mobile station performs the transmit power control. Though FIG. 2 shows only two base stations, the system shown in FIG. 2 is an example of systems having a plurality of base stations and a plurality of mobile stations.

The radio channels used in the present embodiment of the present invention are defined as follows. The radio channel represents a frequency band used in communications. In CDMA, a plurality of codes are multiplexed in the frequency band. In FDMA (Frequency Division Multiple Access), the frequency band is divided into smaller frequency bands. In TDMA (Time Division Multiple Access), the frequency band is shared on the time division basis.

Figure 3:
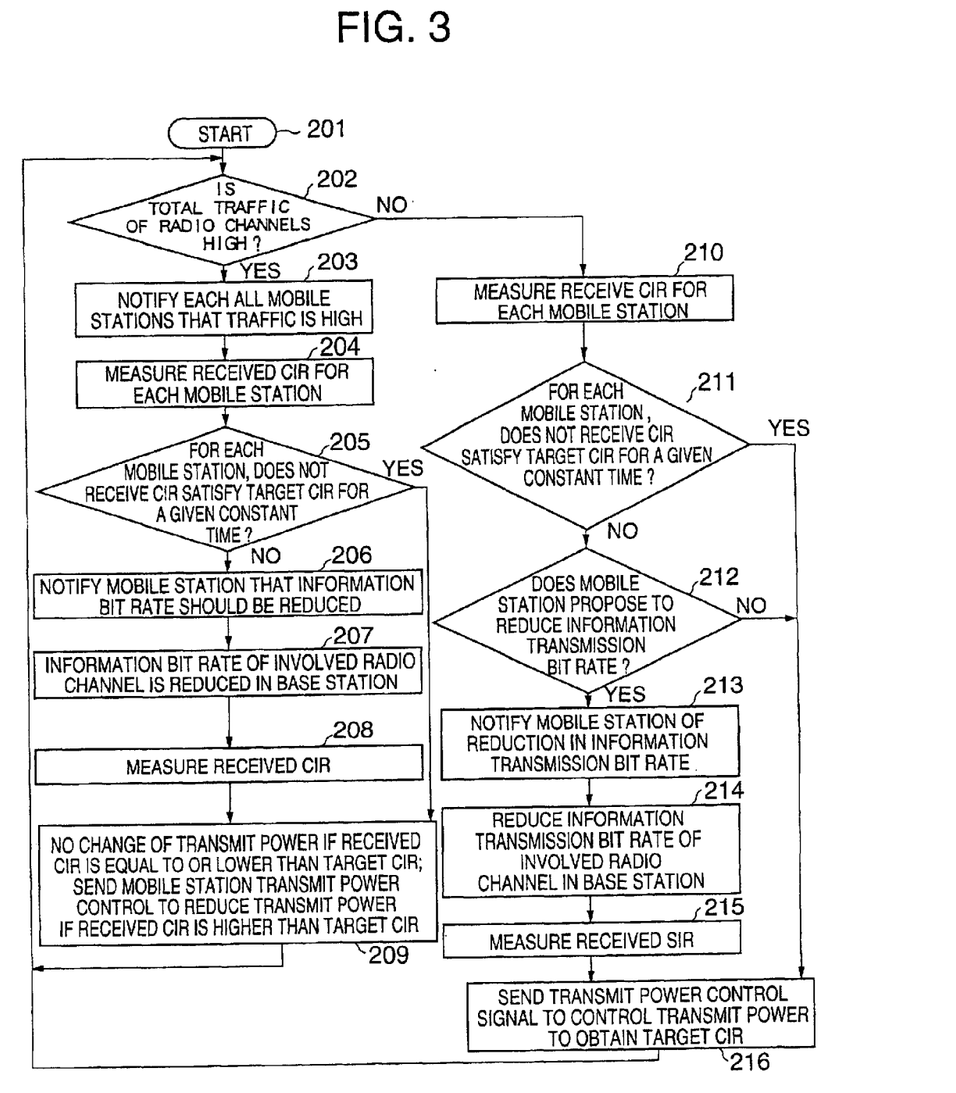
FIG. 3 is a flowchart of an operation of a base station in a transmit power control of an uplink signal and an information transmission bit rate control according to the embodiment of the present invention.

FIG. 3 is a flowchart of an operation of each base station involved in the transmit power control of an uplink signal and information transmission bit rate control thereof according to the present embodiment of the invention.

First, the base station of interest determines whether the traffic of radio channels is high (202). If the answer of step 202 is YES, the base station notifies all mobile stations located in its own cell that the traffic is high (203). This notification is carried out by a method of definitely sending information to all the mobile stations that communicate with the base station. Next, the base station measures the received CIR (204) of each mobile station. Then, the base station determines, for each mobile station, whether the received CIR does not satisfy the target CIR at all for a given constant time (205).

If it is determined at step 205 that the received CIR of a mobile station does not satisfy the target CIR at all for the given constant time, the base station notifies the above mobile station that the information transmission bit rate of the involved radio channel should be reduced (206). Then, the base station reduces the information transmission bit rate of the involved radio channel (207). Then, the base station measures the received CIR of the mobile station of interest. If the received CIR is equal to or lower than the target CIR, the transmit power is not altered. In contrast, if the received CIR is higher than the target CIR, the base station sends the above mobile station a transmit power control signal which requests the mobile station to reduce the transmit power (209).

In contrast, at step 205, if a situation is not detected in which the received CIR of a mobile station does not satisfy the target CIR at all for the given constant time, the base station does not change the information transmission bit rate, and does not change the transmit power when the received CIR is lower than or equal to the target CIR. If the received CIR of a mobile station is higher than the target CIR, the base station sends the above mobile station the transmit power control signal that requests the mobile station to reduce the transmit power (209).

A description will be given of a sequence carried out when the traffic is not high. First, the base station measures the received CIR of each mobile station (210). Next, the base station determines, for each mobile station, whether the received CIR does not satisfy the target CIR at all for the given constant time (211). If it is determined, at step 211, that the received CIR of a mobile station does not satisfy the target CIR at all for the given constant time, the base station determines whether there is a proposal to reduce the information transmission bit rate from the above mobile station (212). If there is such a proposal, the base station notifies the mobile station of interest that the information transmission bit rate will be reduced (213), and reduces the information transmission bit rate of the involved radio channel (214). Then, the base station measures the received CIR of the mobile station of interest (215). At step 216, the base station sends the mobile station to the transmit power control signal which requests the mobile station to reduce the transmit power if the received CIR is higher than the target CIR and to increase the transmit power if the received CIR is lower than the target CIR. If the received CIR is equal to the target CIR, the transmit power is not changed.

In contrast, at step 211, if a situation is not detected in which the received CIR of a mobile station does not satisfy the target CIR at all for the given constant time, or if there is no proposal from the mobile station at step 212, the base station performs the above-mentioned transmission control at step 216.

After the base station sends the transmit power control signal to the mobile station involved irrespective of whether the traffic is high or not, the sequence returns to step start 201, and the above-mentioned operation is repeated.

In CDMA, the decision of step 202 is made as follows. The base station measures the total received power level of the radio channels, and compares it with a predetermined threshold level. If the total received power level is equal to or higher than the threshold level, it is determined that the total traffic of the radio channels is high. In contrast, if the total received power level is lower than the threshold level, it is determined that the total traffic of the radio channels is not high.

Figure 4:
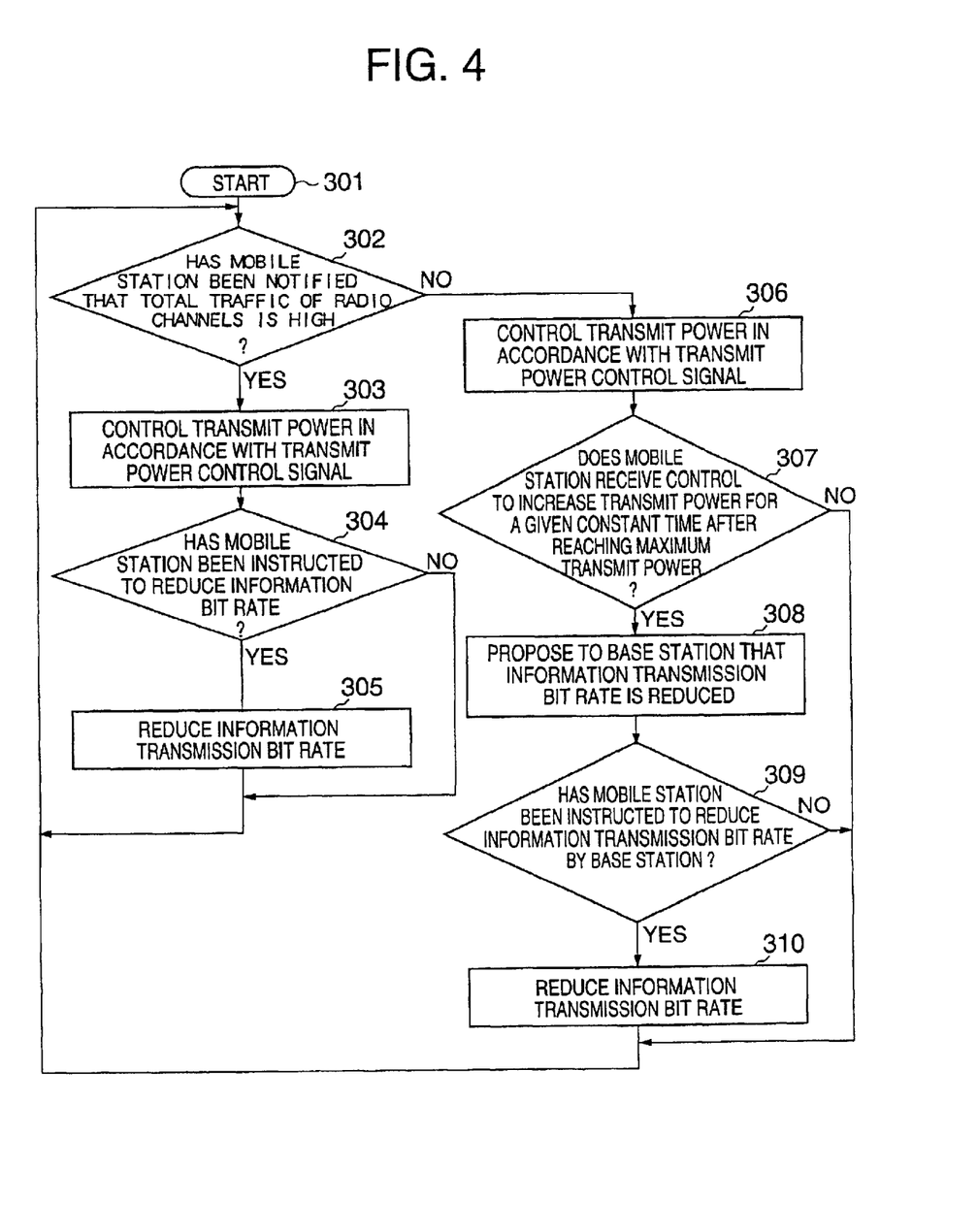
FIG. 4 is a flowchart of an operation of a mobile station in a transmit power control of an uplink signal and an information transmission bit rate control according to the embodiment of the present invention.

FIG. 4 is a flowchart of an operation of each mobile station involved in the transmit power control of an uplink signal and information transmission bit rate control thereof according to the present embodiment of the invention.

The mobile station determines whether it has been notified by the base station that the total traffic of the radio channels is high (302). If the answer of step 302 is YES, the mobile station controls the transmit power in accordance with the transmit power control signal (303). Then, the mobile station discerns whether it has been instructed to reduce the information transmission bit rate by the base station (304). If the answer of step 304 is YES, the mobile station reduces the information transmission bit rate (305). In contrast, if the answer of step 304 is NO, the sequence returns to start 301.

In contrast, at step 302, if it is determined that the mobile station has not been notified that the traffic of the radio channels is high, the mobile station controls the transmit power in accordance with the transmit power control signal (306). Then, the mobile station determines whether it has received the control signal to increase the transmit power for a predetermined constant time after the transmit power reaches the maximum power (307). If the answer of step 307 is YES, the mobile station sends the base station the proposal to reduce the information transmission bit rate (308). Then, the mobile station checks whether it has been instructed to reduce the information transmission bit rate by the base station (309). If the answer of step 309 is YES, the mobile station reduces the information transmission bit rate (310). Then, the sequence returns to start 301. If the answers of steps 307 and 309 are NO, the sequence returns to start 301.

The above-mentioned operations of the base station and mobile station result in the following advantages.

First, in a case where the traffic of radio channels is high and thus the predetermined communications quality cannot be satisfied at the given information transmission bit rate for a certain time, the receiving side does not instruct the transmitting side to increase the transmit power but the information transmission bit rate is reduced on both the transmitting and receiving sides so as to satisfy the given communications quality. Hence, the communications can continue.

Second, in a case where the received level on the receiving side decreases and thus the predetermined communications quality cannot be satisfied at the given information transmission bit rate for a certain time, the information transmission bit rate is reduced on both the transmitting and receiving sides so as to satisfy the given communications quality. Thus, the communications can continue.

Figure 5:
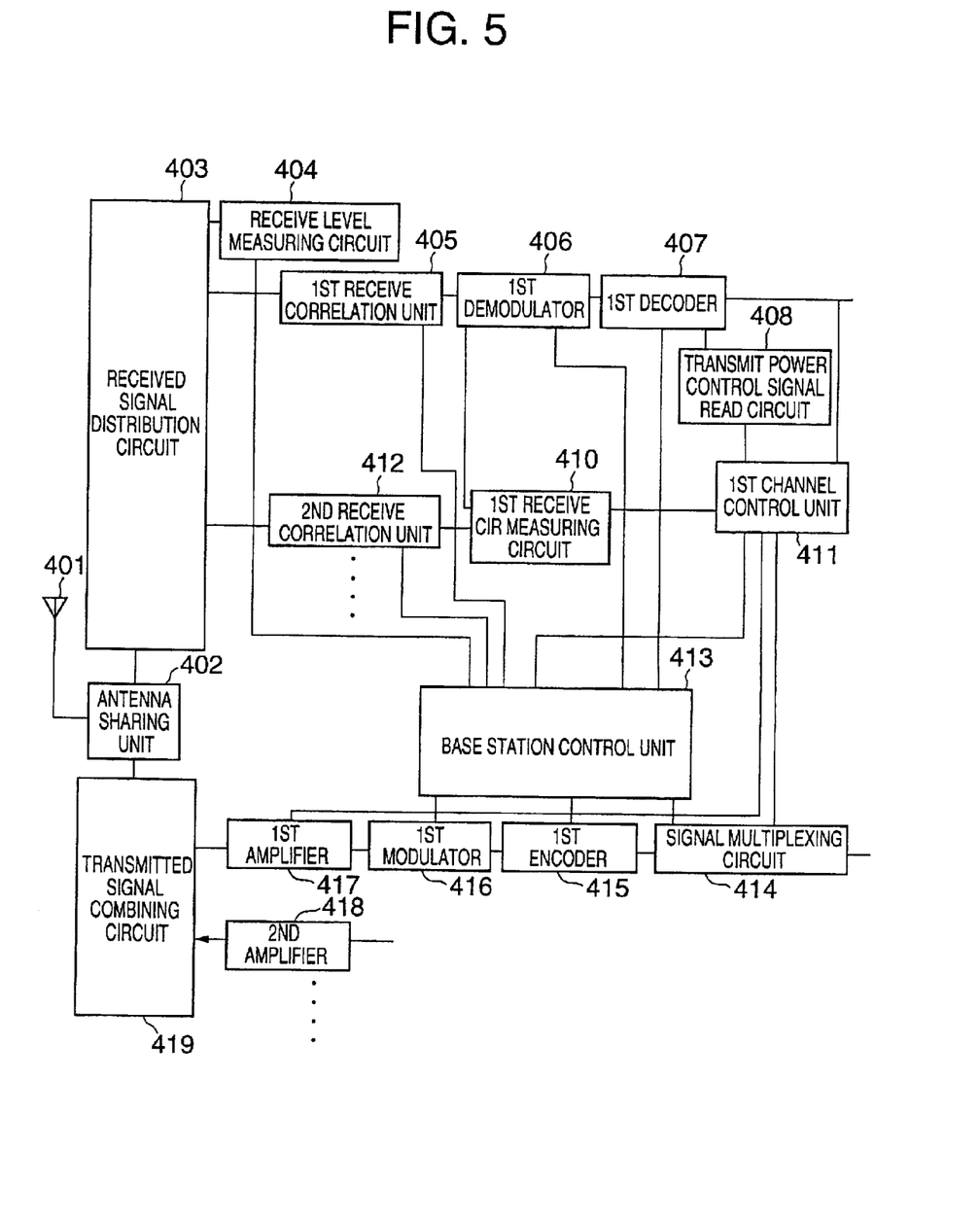
FIG. 5 is a block diagram of a configuration of a base station used when the present invention is applied to CDMA.

FIG. 5 is a block diagram of the base station used in a case where the present invention is applied to CDMA. The configuration of the base station shown in FIG. 5 can handle a plurality of mobile stations, and has identical structures respectively provided to the mobile stations. For the sake of simplicity, FIG. 5 illustrates the entire structure involved in one (first) channel, and a part of the structure involved in the second channel, while omitting the structures respectively involved in the remaining channels. It is to be noted that an antenna 401, an antenna sharing unit 402, a received signal distribution circuit 403, and a transmitted signal combining circuit 419 are shared by all the radio channels.

The base station includes the antenna 401, the antenna sharing unit 402, the received signal distribution circuit 403, a received level measuring circuit 404, a first receive correlation unit 405, and a first demodulator 406. The antenna 401 is used to transmit and receive signals. The antenna sharing unit 402 is used to share the antenna 401 in transmitting and receiving. The received signal distribution circuit 403 distributes a received signal to the received level measuring circuit 404 and the first receive correlation unit 405, etc. The received level measuring circuit 404 measures the entire received level of the received signals from the received signal distribution circuit 403. The first receive correlation unit 405 takes a correlation between the received signal from the received signal distribution circuit 403 and a spreading code specified by a base station control unit 413, determines a receive timing based on the correlation, and performs despreading. The first demodulator 406 demodulates the output signal of the first receive correlation unit 405, and outputs a resultant encoded signal. The first demodulator 406 also has the function of changing the spreading gain in accordance with an instruction from the base station control unit 413.

The base station shown in FIG. 5 further includes a first decoder 407, a transmit power control signal read circuit 408, a first received CIR measuring circuit 410, and a first channel control unit 411. The first decoder 407 decodes the encoded signal from the first demodulator 406, and outputs a resultant information signal. The first decoder 407 is also equipped with the function of decoding a plurality of bits which represent the original one bit of information in order to improve the reliability to thereby reproduce the original one bit of information in accordance with an instruction by the base station control unit 413. Further, the first decoder 407 has the function of decoding packets that are transmitted a plurality of times to reproduce the original information.

The transmit power control signal read circuit 408 extracts the transmit power control signal from the information signal output by the decoder 407. The received CIR measuring circuit 410 measures the received CIR through the first demodulator 406. The first channel control unit 411 determines the transmit power to the mobile station from the output of the transmit power control signal read circuit 408, and controls a first amplifier 417 in accordance with the transmit power thus determined. Further, the first channel control unit 411 produces the transmit power control signal to be transmitted to the mobile station by comparing the output of the first received CIR measuring circuit 410 with the target CIR, and sends the transmit power control signal to a signal multiplexing circuit 414.

Furthermore, the base station shown in FIG. 5 is equipped with a second receive correlation unit 412, a first encoder 415, and a first modulator 416 in addition to the above-mentioned base station control unit 413, the signal multiplexing circuit 414 and the first amplifier 417.

The base station control unit 413 has the following functions. The first function of the base station control unit 413 is to recognize the current traffic of the radio channel by referring to the received level measured by the received level measuring circuit 404. The second function is to indicate the spreading code to the receive correlation units and the modulator. The third function is to change the spreading gain in the first demodulator 406 and the first modulator 416, as necessary. The fourth function is to represent one bit of information in terms of a plurality of bits in order to improve the reliability. The fifth function is to form a packet consisting of a plurality of bits and transmit the packet a plurality of times.

The signal multiplexing circuit 414 multiplexes information to be transmitted, the transmit power control information produced by the first channel control unit 411 and transmitted to mobile stations, and a variety of control information to be sent to mobile stations. The first encoder 415 encodes the multiplexed signal from the signal multiplexing circuit 414. The first encoder 415 is also equipped with the function of representing one bit of information by a plurality of bits in order to improve the reliability and the function of assembling a plurality of bits into a packet and transmitting the packet a plurality of times in accordance with an instruction from the base station control unit 413.

The first modulator 416 modulates the encoded signal and spreads the modulated signal by the spreading code specified by the base station control unit 413. The first modulator 416 is also equipped with the function of changing the spreading gain in accordance with an instruction from the base station control unit 413. The first amplifier 417 amplifies the modulated signal to obtain the transmit power specified by the first channel control unit 411.

The base station shown in FIG. 5 also includes a second amplifier 418, and the aforementioned transmitted signal combining circuit 419, which combines the transmission signals from a plurality of amplifiers including the first amplifier 417 and the second amplifier 418, and supplies the combined signal to the antenna sharing unit 402.

In the configuration shown in FIG. 5, the transmit power control information is accompanied with the information signal. Alternatively, the transmit power control information may be transmitted by using another channel.

A further description will be given of the configuration of the base station shown in FIG. 5 and the operation thereof shown in FIG. 3.

Step 202: The base station measures the received level of ratio channel in the received level measuring circuit 404. The received level thus measured is sent to the base station control unit 413. The unit 413 compares the received level measured by the unit 404 with the given threshold level, and thus determines whether the traffic of the radio channels is high.

Step 203: If it is determined that the received level is higher than the threshold level and the traffic is thus high, the base station control unit 413 sends the signal multiplexing circuit 414 the information showing that the traffic is high. The signal multiplexing circuit 414 multiplexes the above information to the information signal. The multiplexed signal is transmitted to the mobile stations via the encoder, the modulator and the amplifier.

Step 204: The first received CIR measuring circuit 410 measures the received CIR of the signal from the first mobile station and sends the received CIR to the first channel control unit 411.

Step 205: The first channel control unit 411 compares the received CIR with the target CIR. If the received CIR does not satisfy the target CIR at all for the given constant time, the first channel control unit 411 notifies the base station control unit 413 of that situation.

Step 206: The base station control unit 413 sends the control signal to the first mobile station via the transmit system including the signal multiplexing circuit 414, the above control signal showing that the information transmission bit rate should be reduced.

Step 207: One or both of the first demodulator 406 and the first decoder 407 are controlled to reduce the information transmission bit rate. Simultaneously, one or both of the first modulator 416 and the first encoder 415 are controlled to reduce the information transmission bit rate.

Step 208: The information transmission bit rate is reduced on both the base station and the mobile station, and then the first received CIR measuring circuit 410 measures the received CIR of the signal from the mobile station of interest. The received CIR thus measured is sent to the first channel control unit 411.

Step 209: The channel control unit 411 compares the received CIR with the target CIR. If the received CIR is equal to or lower than the target CIR, the channel control unit 411 sends the first mobile station the transmit power control signal which indicates that there is no need to change the transmit power. In contrast, if the received CIR is higher than the target CIR, the channel control unit 411 sends the first mobile station the transmit power control signal which instructs the mobile station to reduce the transmit power.

Step 210: The first received CIR measuring circuit 410 measures the received CIR of the signal from the first mobile station, and sends the received CIR thus measured to the first channel control unit 411.

Step 211: The first channel control unit 411 compares the received CIR with the target CIR. If the received CIR does not satisfy the target CIR for the given constant time at all, the first channel control unit 411 notifies the base station control unit 413 of that fact.

Step 212: If the received signal from the first mobile station contains information that proposes to reduce the information transmission bit rate, the base station control unit 413 is informed of the above proposal via the channel control unit 411.

Step 213: When a reduction in the information transmission bit rate is proposed by the first mobile station, the base station control unit 413 sends the first mobile station the control signal which requests the first mobile station to reduce the information transmission bit rate via the transmission system including the signal multiplexing circuit 414.

Step 214: One or both of the first demodulator 406 and the first decoder 407 are controlled to reduce the information transmission bit rate. Simultaneously, one or both of the first modulator 416 and the first encoder 415 are controlled to reduce the information transmission bit rate.

Step 215: The information transmission bit rate is reduced on both the base station and the mobile station, and then the first received CIR measuring circuit 410 measures the received CIR of the signal from the mobile station of interest. The received CIR thus measured is sent to the first channel control unit 411.

Step 216: The channel control unit 411 compares the received CIR with the target CIR. If the received CIR is equal to or lower than the target CIR, the channel control unit 411 sends the first mobile station the transmit power control signal which indicates that there is no need to change the transmit power. In contrast, if the received CIR is higher than the target CIR, the channel control unit 411 sends the first mobile station the transmit power control signal which instructs the mobile station to reduce the transmit power.

Figure 6:
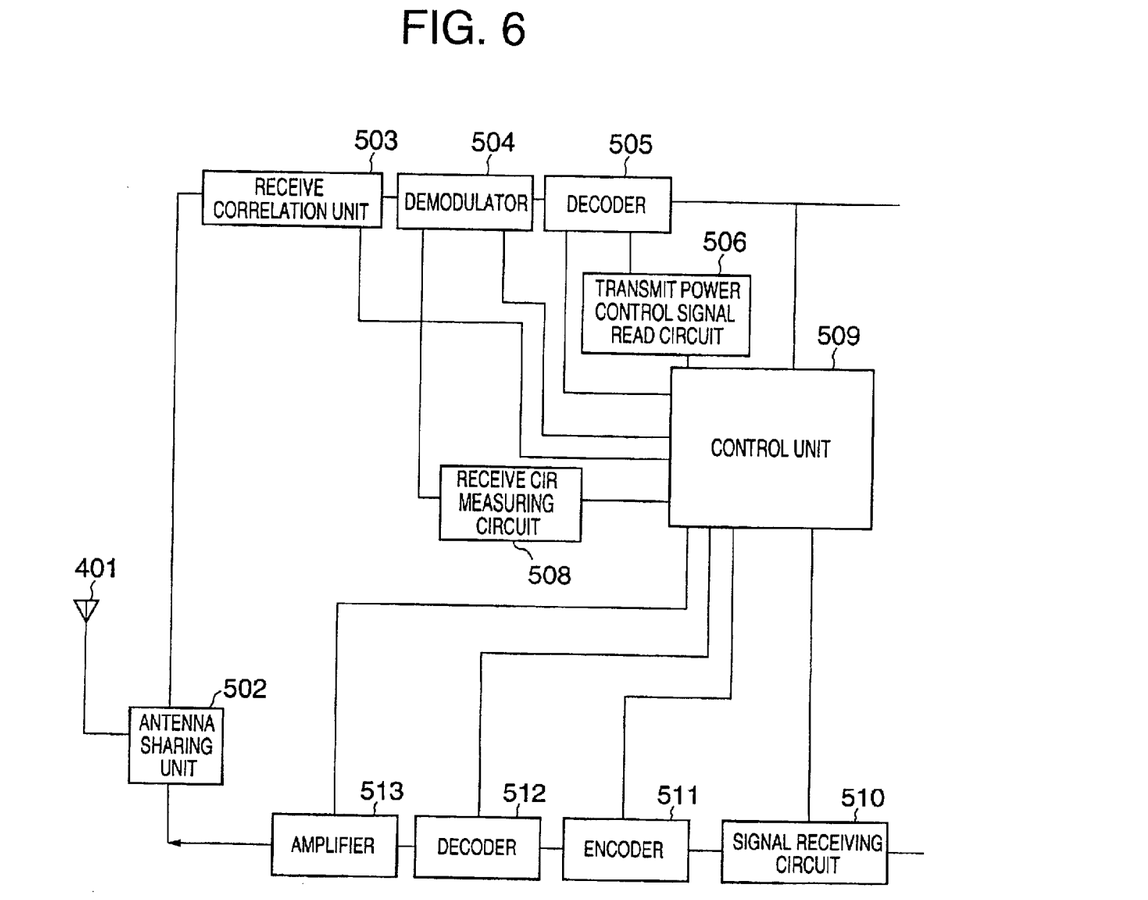
FIG. 6 is a block diagram of a configuration of a mobile station used when the present invention is applied to CDMA.

FIG. 6 is a block diagram of a configuration of a mobile station used in a case where the present invention is applied to CDMA.

The mobile station shown in FIG. 6 includes an antenna 501, an antenna sharing unit 502, a receive correlation unit 503, a demodulator 504, a decoder 505, a transmit power control signal read circuit 506, a received CIR measuring circuit 508, a control unit 509, a signal multiplexing circuit 510, an encoder 511, a modulator 512, and an amplifier 513.

The antenna 501 is used to transmit and receive signals. The antenna sharing unit 502 is used to share the antenna 501 in transmitting and receiving. The receive correlation unit 503 takes a correlation between the received signal from the antenna sharing unit 502 and a spreading code specified by the control unit 509, determines a receive timing based on the correlation, and performs despreading. The demodulator 504 demodulates the output signal of the receive correlation unit 503, and outputs a resultant encoded signal. The demodulator 504 also has the function of changing the spreading gain in accordance with an instruction from the control unit 509.

The decoder 505 decodes the encoded signal from the demodulator 504, and outputs a resultant information signal. The decoder 505 is also equipped with the function of decoding a plurality of bits which represent the original one bit of information in order to improve the reliability to thereby reproduce the original one bit of information. Further, the decoder 505 has the function of decoding packets that are transmitted a plurality of times to reproduce the original information. The transmit power control signal read circuit 506 extracts the transmit power control signal from the information signal output by the decoder 505.

The received CIR measuring circuit 508 measures the received CIR through the demodulator 504. The control unit 509 determines the transmit power of its own mobile station by referring to the output of the transmit power control signal read circuit 506, and sends a corresponding instruction to the amplifier 513. Also, the control unit 509 produces the transmit power control signal to be sent to the base station from the output of the received CIR measuring circuit 508, and supplies it to the signal multiplexing circuit 510. Further, the control unit 509 recognizes and manages the transmit power level of its own mobile station involved in the current radio channel and the maximum transmit power level thereof. Furthermore, the control unit 509 manages the current information transmission bit rate, and supplies, as necessary, the demodulator 504 and the modulator 512 with an instruction to change the spreading gain as an instruction about change of the information transmission bit rate. Moreover, the control unit 509 represents one bit of information in terms of a plurality of bits in order to improve the reliability. Additionally, the control unit 509 forms a packet consisting of a plurality of bits and transmits the packet a plurality of times.

The signal multiplexing circuit 510 multiplexes information to be transmitted, the transmit power control information produced by the control unit 509 and transmitted to mobile stations, and a variety of control information to be set to mobile stations. The encoder 511 encodes the multiplexed signal from the signal multiplexing circuit 510. The encoder 511 is also equipped with the function of representing one bit of information by a plurality of bits in order to improve the reliability and the function of assembling a plurality of bits into a packet and transmitting the packet a plurality of times in accordance with an instruction from the control unit 509.

The modulator 512 modulates the encoded signal and spreads the modulated signal by the spreading code specified by the control unit 509. The modulator 512 is also equipped with the function of changing the spreading gain in accordance with an instruction from the control unit 509. The amplifier 513 amplifies the modulated signal to obtain the transmit power specified by the control unit 509.

In the configuration shown in FIG. 6, the transmit power control information is accompanied with the information signal. Alternatively, the transmit power control information may be transmitted by using another channel.

A description will be given of the configuration of the mobile station shown in FIG. 6 and the operation thereof shown in FIG. 4.

Step 302: The control unit 509 of the mobile station reads information from the signal sent by the base station via the receive system from the antenna 501 to the decoder 505. Then, the control unit 509 determines whether a report showing that the traffic of the radio channels is high has been reported.

Step 303: The transmit power control signal read circuit 506 reads the transmit power control signal addressed to the mobile station from the received signal sent by the base station, and supplies it to the control unit 509. Then, the control unit 509 notifies the amplifier 513 of the transmit power indicated by the transmit power control signal.

Step 304: The control unit 509 discerns whether the received signal from the base station includes the control signal which instructs reduction in the information transmission bit rate.

Step 305: If the above control signal is included in the received signal, the control unit 509 instructs one or both of the demodulator 504 and the decoder 505 to reduce the information transmission bit rate, and instructs one or both of the first modulator 416 and the first encoder 415 to reduce the information transmission bit rate.

Step 306: The transmit power control signal read circuit 506 reads the transmit power control information to the mobile station from the received signal sent by the base station, and supplies it to the control unit 509. Then, the control unit 509 notifies the amplifier 513 of the transmit power indicated by the transmit power control signal.

Step 307: The control unit 509 determines whether it has continuously received the control signal to increase the transmit power for the predetermined constant time after the transmit power reaches the maximum power.

Step 308: If it is determined that the control signal to increase the transmit power for the predetermined constant time after the transmit power reaches the maximum power is continuously received, the control unit 509 sends the control signal which proposes to reduce the information transmission bit rate to the base station via the transmission system.

Step 309: The control unit 509 determines whether the received signal from the base station includes the control signal which instructs the mobile station to reduce the information transmission bit rate.

Step 310: If the above control signal is included in the received signal, the control unit 509 instructs one or both of the demodulator 504 and the decoder 505 to reduce the information transmission bit rate, and instructs one or both of the first modulator 416 and the first encoder 415 to reduce the information transmission bit rate.

A description will be given of first through third methods for changing the information transmission bit rate and thus changing quality of communications in both the base station and mobile station.

The first method is to increase the spreading gain in the same spreading band in CDMA. In this case, the information transmission bit rate is reduced, while resistance to interference is improved. Thus, the signal can be received at a higher CIR.

The second method is to represent one bit of information by using a plurality of bits. For example, an identical information bit is transmitted a plurality of times, and a received signal is reproduced from the identical information bits separately received. In this case, the information transmission bit rate is reduced, while resistance to interference is improved. Thus, a high quality of communications can be ensured even at a lower CIR.

The third method is to assemble a plurality of bits into a packet and send the packet a plurality of times. A received signal is reproduced from the identical packets separately received. In this case, the information transmission bit rate is reduced, while resistance to interference can be improved. Thus, a high quality of communications can be ensured at a lower CIR.

In the above-mentioned embodiment of the present invention, any of the first through third methods and any combination thereof can be employed. In the first method, the modulator and the demodulator are instructed to change the spreading gain. In the second and third methods, the encoder and the decoder are instructed to represent one bit of information by a plurality of bits or to send a packet formed by a plurality of bits a plurality of times.

It is also possible to employ other methods for reducing the information transmission bit rate to thereby improve the quality of communications. In the aforementioned embodiment of the present invention, the transmit power of the mobile station is controlled. Alternatively, the transmit power may be controlled in the base station. In the alternative, the mobile station produces the transmit power control signal from the received CIR. The base station changes the transmit power in response to the transmit power control signal sent by the mobile station. That is, the functions of the base station and the mobile station are interchanged.

In the aforementioned embodiment of the present invention, CDMA is used as a radio transmission system. It is also possible to employ FDMA or TDMA in case the traffic of radio channels is recognized and a decision as to whether the maximum transmit power is set to the radio channels can be made.

In the conventional art, a communication is forced to be disconnected when the traffic of radio channels is high and the given communications quality cannot be satisfied. In contrast, according to the present invention, the information transmission bit rate is reduced so that the given communications quality can be ensured. Thus, it is possible to prevent the communication from being forced to be disconnected so that the communication can continue and the grade of service can be improved.

In the conventional art, a communication is forced to be disconnected when the given communications quality cannot be obtained even in a case where one or both of the mobile station located in the periphery of the cell and the associated base station transmit the signal at the maximum transmit power. Thus, it is possible to prevent the communication from being forced to be disconnected so that the communication can continue and the grade of service can be improved. When the invention is applied to packet communications, the throughput can be ensured to a some extent, and the delay in transmission can be shortened.

The present invention is not limited to the specifically described embodiments, and variations and modifications may be made without departing from the scope of the present invention.

The present application is based on Japanese priority application no. 11-375793 filed on Dec. 28, 1999, the entire contents of which are hereby incorporated by reference.

What is claimed is:

1. A mobile communication system comprising:
a mobile station and a base station connected via one or a plurality of radio channels for communication,
the base station including
traffic measuring means for measuring traffic of said one or a plurality of radio channels in the mobile communication system,
rate setting means for changing a transmission bit rate,
control means for determining the transmission bit rate based on the traffic measured by said traffic measuring means, and
signal multiplexing means for transmitting to the mobile station control information containing information about the transmission bit rate determined by said control means; and
the mobile station comprising
communication means for communicating with the base station in accordance with said information about the transmission bit rate received from the base station, wherein the mobile station is configured to transmit a signal that requests the base station to decrease the transmission bit rate, when the traffic of one or plurality of radio channels in use is smaller than a predetermined value and a command to increase a transmit power beyond a maximum transmit power is received from the base station continuously over a predetermined period.

2. The mobile communication system as claimed in claim 1, wherein the base station further comprises:
communication-quality measurement means for measuring a communication quality of said one or a plurality radio channels in use in said system, and wherein
said control means including means for determining a transmit power of the mobile station based on both the measured traffic and the measured communication quality,
the control information, transmitted to the mobile station by said signal multiplexing means, includes information for controlling a transmit power of the mobile station, and
said communication means of the mobile station including means for determining the transmit power based on said control information received from the base station.

3. The mobile communication system as claimed in claim 2 wherein the base station is configured to restrain the transmit power of the mobile station when the traffic of the one or plurality of radio channels in use is larger than a predetermined value and the communication quality of the one or plurality of radio channels in use is degraded below a predetermined level.

4. The mobile communication system as claimed in claim 2 wherein the base station is configured to decrease the transmission bit rate when the traffic of the one or plurality of radio channels in use is larger than a predetermined value and the communication quality of the one or plurality of radio channels in use is degraded below a predetermined level.

5. The mobile communication system as claimed in claim 2 wherein the communication quality is one or a plurality of received carrier to interference ratios CIRS of one or a plurality of signals transmitted over one or the plurality of radio channels.

6. The mobile communication system as claimed in claim 1 wherein the one or plurality of radio channels uses a CDMA communication scheme, and said control means includes means for determining a CDMA spreading gain.

7. The mobile communication system as claimed in claim 1 wherein said control means comprises means for transmitting identical information bits a plurality of times.

8. The mobile communication system as claimed in claim 1 wherein the one or plurality of radio channels uses a CDMA communication scheme, and said traffic measuring means includes means for measuring an entire received level of the radio channels.

9. A mobile station which is connected with at least one base station via one or a plurality of radio channels, comprising:
transmission means for controlling a transmit power of the mobile station based on a power control signal received from the base station;
rate setting means for setting a transmission bit rate of the mobile station based on control information received from the base station, the control information containing information related to the transmission bit rate determined by the base station;
reception means for receiving a signal indicating a state of traffic transmitted over one or a plurality of radio channels by the base station; and
signal multiplexing means for transmitting a signal which proposes to the base station that the transmission bit rate is reduced, when the traffic of the one or plurality of radio channels is not larger than a predetermined value and the mobile station is instructed by the base station, for a predetermined period after a transmit power has reached a maximum transmit power, to increase the transmit power.

10. A control method for a mobile station which is connected with at least one base station via one or a plurality of radio channels, comprising steps of:
transmitting a signal which proposes to the base station that a transmission bit rate of the mobile station is reduced, when traffic of said one or a plurality of radio channels in use is larger than a predetermined value and the mobile station is instructed, for a predetermined period after a transmit power has reached a maximum transmit power, to increase the transmit power by the base station; and
reducing the transmission bit rate when a control signal to instruct the mobile station to reduce the transmission bit rate is received from the base station.

* * * * *